US012588661B2

(12) United States Patent
Yang et al.

(10) Patent No.: US 12,588,661 B2
(45) Date of Patent: Mar. 31, 2026

(54) POULTRY AND LIVESTOCK FEEDING AND DRINKING MONITORING SYSTEM

(71) Applicant: NATIONAL PINGTUNG UNIVERSITY OF SCIENCE AND TECHNOLOGY, Pingtung County (TW)

(72) Inventors: Cheng-Huei Yang, Pingtung County (TW); Chin-Lung Chang, Pingtung County (TW)

(73) Assignee: National Pingtung University of Science and Technology, Pingtung County (TW)

( * ) Notice: Subject to any disclaimer, the term of this patent is extended or adjusted under 35 U.S.C. 154(b) by 415 days.

(21) Appl. No.: 18/350,094

(22) Filed: Jul. 11, 2023

(65) Prior Publication Data

US 2025/0017178 A1     Jan. 16, 2025

(51) Int. Cl.
<table>
<tr><td>*A01D 41/14*</td><td>(2006.01)</td></tr>
<tr><td>*A01D 41/127*</td><td>(2006.01)</td></tr>
<tr><td>*A01K 5/02*</td><td>(2006.01)</td></tr>
<tr><td>*A01K 7/02*</td><td>(2006.01)</td></tr>
<tr><td>*A01K 39/04*</td><td>(2006.01)</td></tr>
</table>

(52) U.S. Cl.
CPC ................ *A01K 39/04* (2013.01); *A01K 5/02* (2013.01); *A01K 7/02* (2013.01)

(58) Field of Classification Search
CPC ............. A01K 39/04; A01K 5/02; A01K 7/02
See application file for complete search history.

(56) References Cited

U.S. PATENT DOCUMENTS

| | | | | |
|---|---|---|---|---|
| 11,229,188 | B2 * | 1/2022 | Jiao ...................... | A01K 29/005 |
| 2018/0160649 | A1 * | 6/2018 | Hicks ..................... | A01K 29/00 |
| 2024/0381839 | A1 * | 11/2024 | Mora Mcginity ........ | E03B 3/02 |

FOREIGN PATENT DOCUMENTS

| | | | | | |
|---|---|---|---|---|---|
| CN | 110024705 | A | * | 7/2019 | .......... G05D 7/0635 |
| CN | 210641905 | U | * | 6/2020 | |

(Continued)

OTHER PUBLICATIONS

English Machine Translation of CN-111955385-A, pp. 1-16 (Year: 2020).*

(Continued)

*Primary Examiner* — Christopher E. Everett
*Assistant Examiner* — Magdalena I Kossek
(74) *Attorney, Agent, or Firm* — Rosenberg, Klein & Lee

(57)      ABSTRACT

A poultry and livestock feeding and monitoring system is provided. The system mainly includes a feeding management unit, a mobile monitoring unit, and a remote monitoring unit. A plurality of control parameters and schedules are set up by the mobile monitoring unit or the remote monitoring unit for driving the feeding management unit to work. Thus various operations including water quality monitoring, drinking water supply, drinking water recovery, and measurement of weight of poultry and livestock, etc. are carried out according to the schedules being set. Therefore, the amount of water consumed by the poultry and livestock and weight of the poultry and livestock can be understood accurately. A warning is issued when the poultry and livestock drink insufficient amount of water. Thereby healthy growth of the poultry and livestock is ensured.

9 Claims, 8 Drawing Sheets

(56)     References Cited

FOREIGN PATENT DOCUMENTS

| CN | 111955385 | A | * | 11/2020 | ......... | A01K 39/0213 |
| GB | 2553262 | A | * | 3/2018 | ............. | G01F 3/065 |

OTHER PUBLICATIONS

English Machine Translation of CN-210641905-U, pp. 1-24 (Year: 2020).*
English Machine Translation of CN-110024705-A, pp. 1-22 (Year: 2019).*

* cited by examiner

POULTRY AND LIVESTOCK FEEDING AND DRINKING MONITORING SYSTEM

BACKGROUND OF THE INVENTION

Field of the Invention

The present invention relates to an animal feeding system, especially to a poultry and livestock feeding and monitoring system.

Description of Related Art

Generally, poultry and livestock now mainly drink water by being in contact with a drinking faucet. Yet not only a part of water is lost during drinking process, the amount of water loss and the amount of water consumed are also difficult to learn. The number and growth rate of the poultry and livestock are also uneven so that the amount of water consumed varies. Without knowing the amount of water intake, problems such as insufficient water intake of the poultry or livestock can be found only after the poultry or livestock are sick. Moreover, drinking water quality also has impact on health of the poultry or livestock.

The drinking status of the poultry and livestock are associated with their health conditions. As to body weight of the poultry and livestock, it is not only related to feed efficiency but also an important factor for determining whether the poultry and livestock have drunk sufficient water. Thus accurate understanding of the amount of water consumed and the body weight of the poultry and livestock can help to find out whether the poultry and livestock have health problems earlier. Thereby there is an urgent need to get full understanding of water drinking and growth conditions of the poultry and livestock for people involved in poultry and livestock rearing.

SUMMARY OF THE INVENTION

Therefore, it is a primary object of the present invention to provide a poultry and livestock feeding and monitoring system which is used for accurate understanding of conditions of the poultry and livestock such as water-drinking and body weight to ensure healthy growth of the poultry and livestock.

In order to achieve the above object, a poultry and livestock feeding and monitoring system according to the present invention mainly includes a feeding management unit, a mobile monitoring unit, and a remote monitoring unit. A plurality of control parameters and schedules are set up by the mobile monitoring unit or the remote monitoring unit for driving the feeding management unit to work. Thus various operations including water quality monitoring, drinking water supply, drinking water recovery, and measurement of weight of poultry and livestock, etc. are carried out according to the schedules being set. Therefore, the amount of water consumed by the poultry and livestock and weight of the poultry and livestock can be understood accurately. A warning is issued when the poultry and livestock drink insufficient amount of water. Thereby healthy growth of the poultry and livestock is ensured.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
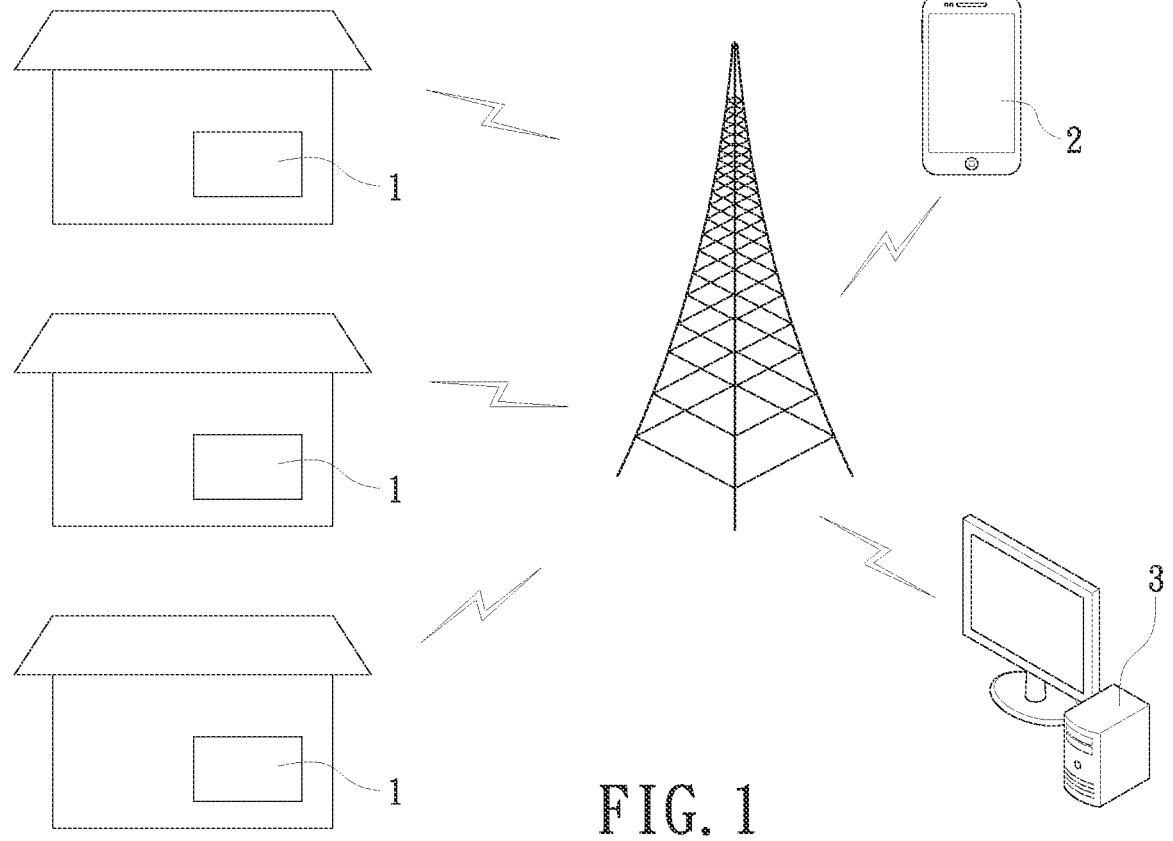
FIG. 1 is a schematic drawing showing connections for signal transmission among respective units of an embodiment according to the present invention.
Figure 2:
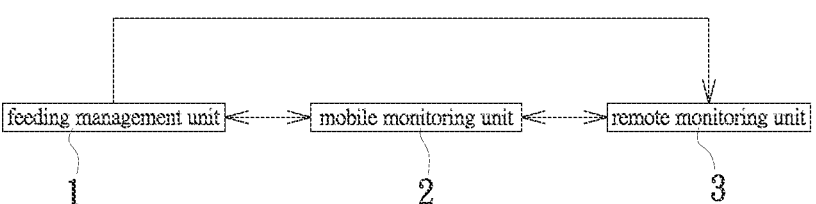
FIG. 2 is a structural drawing showing signal transmission among respective units of an embodiment according to the present invention.
Figure 3:
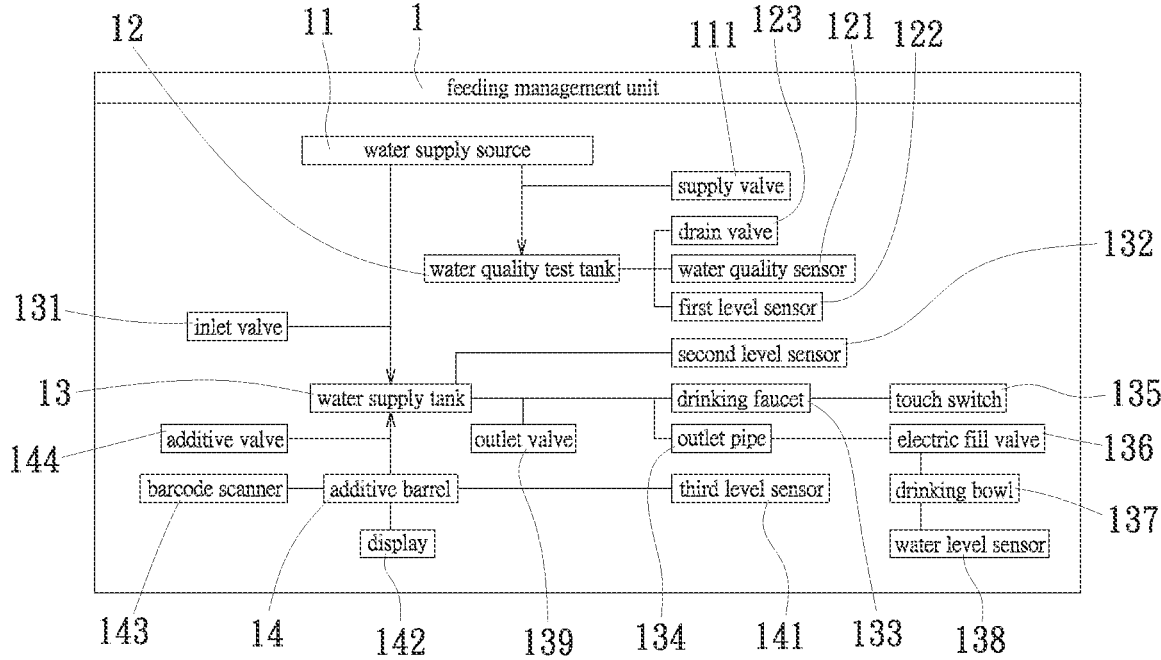
FIG. 3 is a structural drawing showing a structure of a feed management unit of an embodiment according to the present invention.
Figure 4:
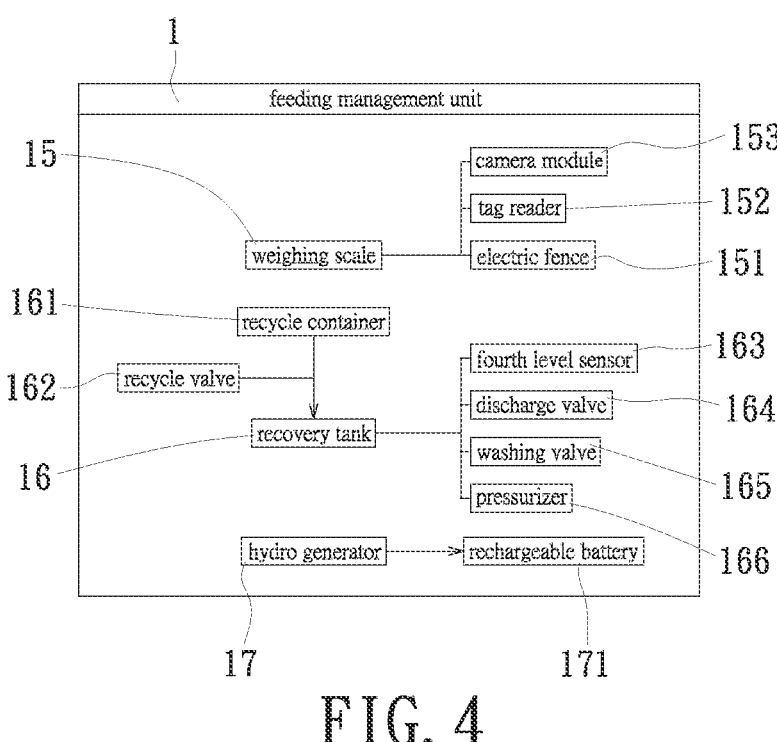
FIG. 4 is a structural drawing showing a further structure of a feed management unit of an embodiment according to the present invention.
Figure 5:
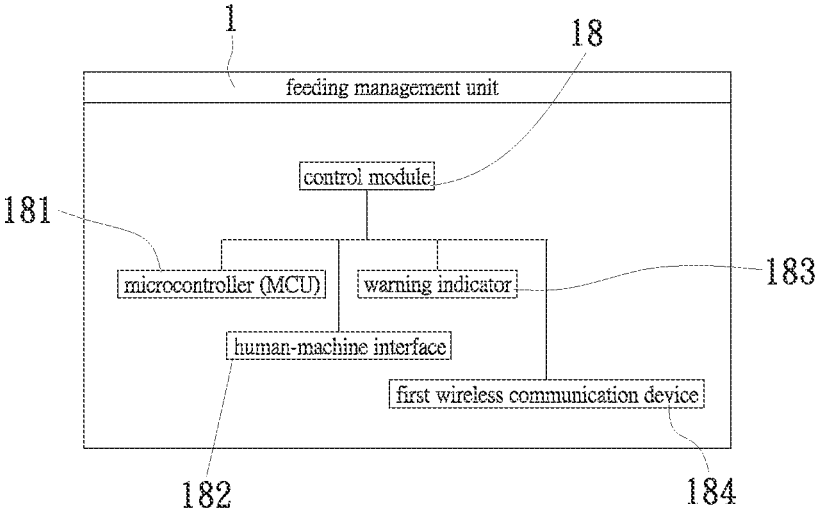
FIG. 5 is a structural drawing showing a further structure of a feed management unit of an embodiment according to the present invention.
Figure 6:
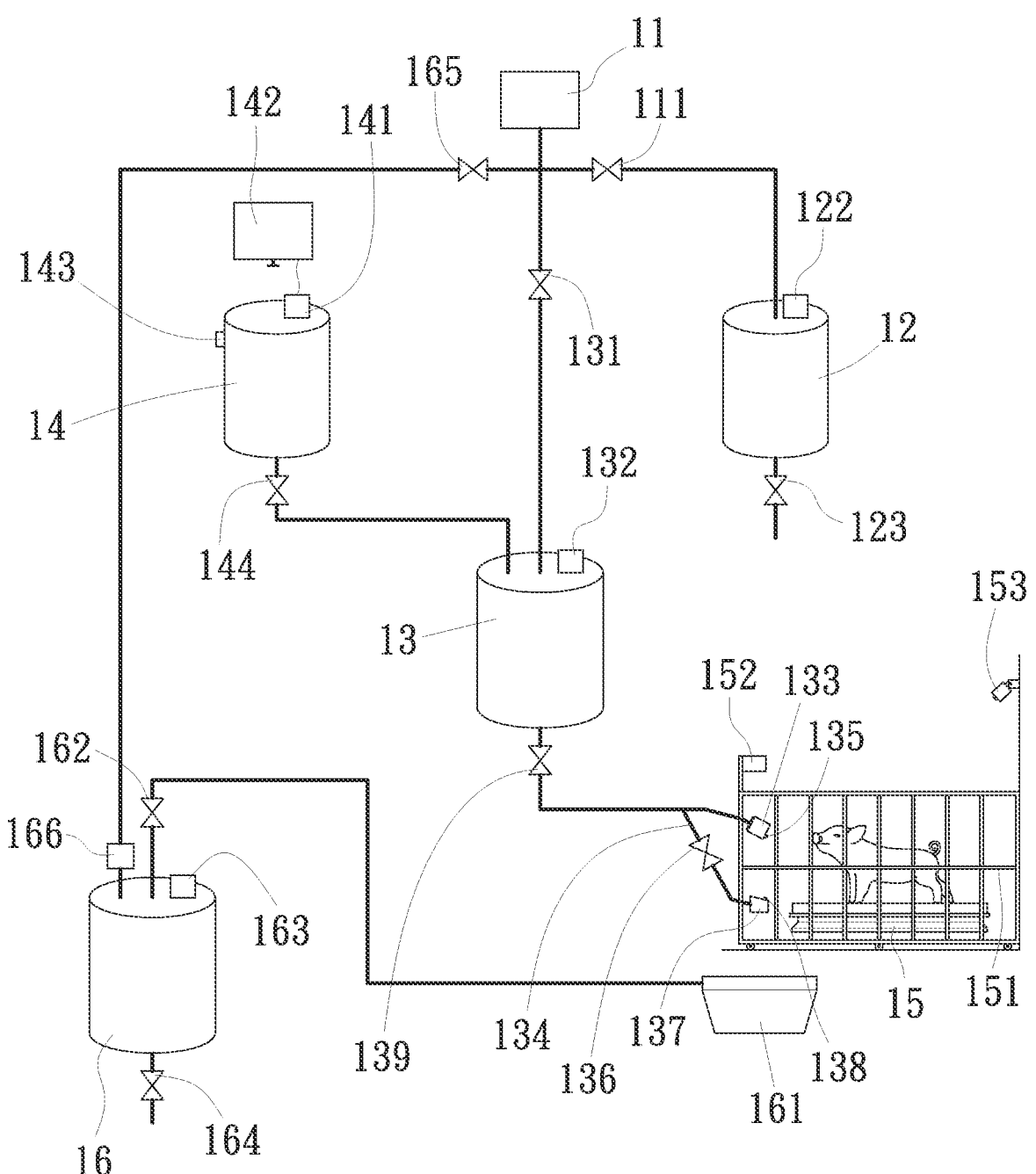
FIG. 6 is a schematic drawing showing arrangement of a feed management unit of an embodiment according to the present invention.

Refer to FIG. 1-2, a poultry and livestock feeding and monitoring system according to the present invention mainly includes at least one feeding management unit 1, a mobile monitoring unit 2, and a remote monitoring unit 3.

Refer to FIG. 3-6, The feeding management unit 1 is arranged at a feeding area and composed of a water supply source 11, a water quality test tank 12 connected with the water supply source 11 by a pipeline, a water supply tank 13 connected with the water supply source 11 by a pipeline, an additive barrel 14 connected with the water supply tank 13 by a pipeline, a weighing scale 15, a recovery tank 16, a hydro generator 17 arranged at least one pipeline of the feeding management unit 1 and electrically connected with at least one rechargeable battery 171, and a control module 18 disposed on the feeding management unit 1. A supply valve 111 is disposed on the pipeline which connects the water supply source 11 with the water quality test tank 12. A water quality sensor 121 and a first level sensor 122 are mounted in the water quality test tank 12 while a drain valve 123 is disposed on a bottom side of the water quality test tank 12. An inlet valve 131 is disposed on the pipeline which connects the water supply source 11 with the water supply tank 13 and a second level sensor 132 is mounted in the water supply tank 13 which is further connected with an outlet module by a pipeline. The outlet module is selected from the group consisting of a drinking faucet 133, an outlet pipe 134, or a combination thereof while a touch switch 135 and an electric fill valve 136 are respectively arranged at the drinking faucet 133 and the outlet pipe 134. A drinking bowl 137 is connected with an end of the outlet pipe 134 and located under the drinking faucet 133. A water level sensor 138 is disposed inside the drinking bowl 137 and an outlet valve 139 is arranged at the pipeline which connects the water supply tank 13 with the outlet module. A third level sensor 141 is mounted in the additive barrel 14 and a display 142 is disposed on the additive barrel 14 and connected with the third level sensor 141 for signal transmission. A barcode scanner 143 is disposed on an upper part of the additive barrel 14 and an additive valve 144 is arranged at the pipeline which connects the water supply tank 13 with the additive barrel 14. As to the weighing scale 15, it is set under the drinking faucet 133 and the drinking bowl 137 of the water supply tank 13 and provided with an electric fence 151 on each of two sides of the weighing scale 15, a tag reader 152 disposed over the drinking faucet 133, and at least one camera module 153 located beside the electric fence 151. A recycle container 161 is arranged under the drinking faucet 133 and the drinking bowl 137 of the water supply tank 13 and connected with the recovery tank 16 by a pipeline while a recycle valve 162 is mounted to the pipeline which connects the recycle container 161 with the recovery tank 16. A fourth level sensor 163 is mounted in the recovery tank 16 and a discharge valve 164 is disposed under the recovery tank 16. The recovery tank 16 and the water supply source 11 are connected by a pipeline on which a washing valve 165 and a pressurizer 166 are disposed in turn. As to the control module 18, it is composed of a microcontroller (MCU) 181, a human-machine interface 182, a warning indicator 183, and a first wireless communication device 184 while the human-machine interface 182, the warning indicator 183, and the first wireless communication device 184 are connected with the MCU 181 for transmitting signals. The human-machine interface 182 can be a monitor or touch screen while the warning indicator 183 can be a warning light, a buzzer, or their combination. The first wireless communication device 184 can be a communication component which supports wireless networks such as 3G, 4G, or Wi-Fi, etc. The MCU 181 is connected with the supply valve 111, the water quality sensor 121, the first level sensor 122, and the drain valve 123 of the water quality test tank 12, the inlet valve 131, the second level sensor 132, the touch switch 135 on the drinking faucet 133, the electric fill valve 136 on the outlet pipe 134, the water level sensor 138 in the drinking bowl 137, and the outlet valve 139 of the water supply tank 13, the third level sensor 141, the display 142, the barcode scanner 143, and the additive valve 144 of the additive barrel 14, the weighing scale 15, the electric fence 151, the tag reader 152, the camera module 153, the fourth level sensor 163, the discharge valve 164, the washing valve 165, and the pressurizer 166 of the recovery tank 16 in a wired or wireless way for signal transmission. The rechargeable battery 171 of the feeding management unit 1 is electrically connected with components which need power including the supply valve 111, the water quality sensor 121, the first level sensor 122, and the drain valve 123 of the water quality test tank 12, the inlet valve 131, the second level sensor 132, the touch switch 135 on the drinking faucet 133, the electric fill valve 136 on the outlet pipe 134, the water level sensor 138 in the drinking bowl 137, and the outlet valve 139 of the water supply tank 13, the third level sensor 141, the display 142, the barcode scanner 143, and the additive valve 144 of the additive barrel 14, the weighing scale 15, the electric fence 151, the tag reader 152, the camera module 153, the fourth level sensor 163, the discharge valve 164, the washing valve 165, and the pressurizer 166 of the recovery tank 16, the MCU 181, the human-machine interface 182, the warning indicator 183, and the first wireless communication device 184 of the control module 18, etc., A water consumption computing program of poultry and livestock is built in the MCU 181. An equation of function built in the water consumption computing program is $W=p*N+(p-L)$; $R=q*M+K$; $D=W-R$; wherein $W$ is amount of water supplied; $R$ is amount of water recovered, $D$ is amount of water consumed, $p$ is full water volume of the water supply tank, $N$ represents how many times the water supply tank is full of water, $L$ is residual amount of water in the water supply tank, $q$ is full water volume of the recovery tank, $M$ represents how many times the recovery tank is full of water, and $K$ is residual amount of water in the recovery tank.

Figure 7:
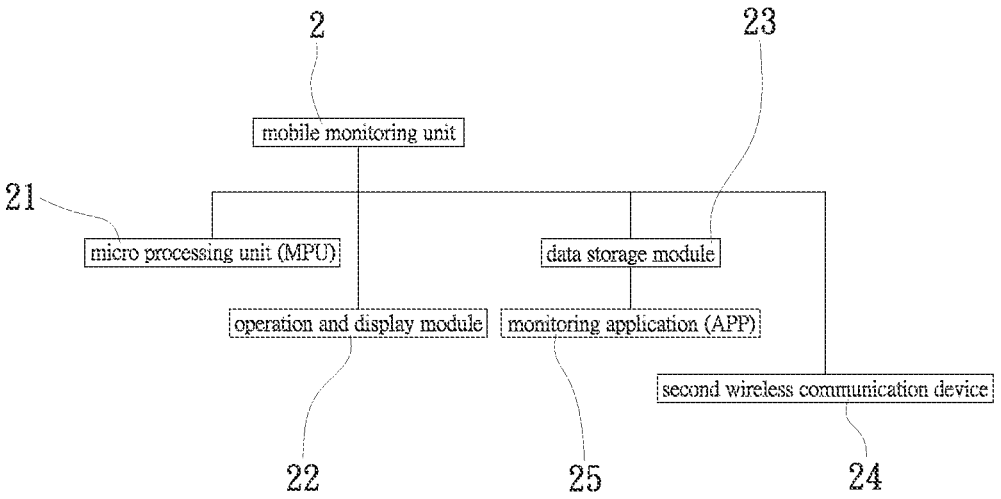
FIG. 7 is a structural drawing showing a mobile monitoring unit of an embodiment according to the present invention.

Refer to FIG. 7, the mobile monitoring unit 2 can be a mobile phone, tablet computer, laptop computer, etc. The mobile monitoring unit 2 includes a micro processing unit (MPU) 21, an operation and display module 22, a data storage module 23, and a second wireless communication device 24 while the operation and display module 22, the data storage module 23, and the second wireless communication device 24 are connected with the MPU 21 for signal transmission. The data storage module 23 is installed with a monitoring application (APP) 25 therein while the second wireless communication device 24 of the mobile monitoring unit 2 and the first wireless communication device 184 of the control module 18 of the feeding management unit 1 are connected for communication.

Figure 8:
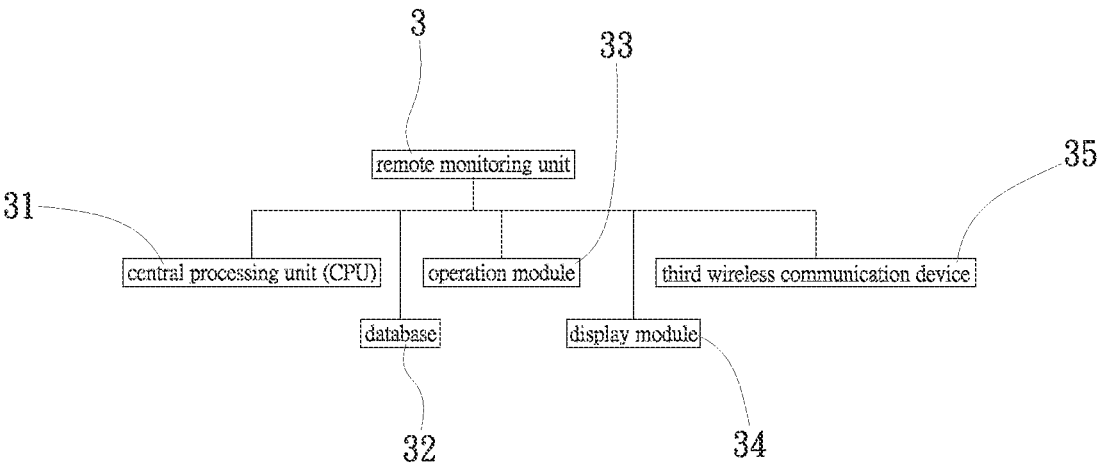
FIG. 8 is a structural drawing showing a remote monitoring unit of an embodiment according to the present invention.

Refer to FIG. 8, the remote monitoring unit 3 is able to be a desktop computer, etc. and composed of a central processing unit (CPU) 31, a database 32, an operation module 33, a display module 34, and a third wireless communication device 35. The database 32, the operation module 33, the display module 34, and the third wireless communication device 35 are connected with the CPU 31 for signal transmission. The database 32 is a relational database used for storage of information and data and built with Structured Query Language (SQL) having an interactive evaluation interface therein. The SQL is not only used for communication with the database 32 but also processing queries input from the interactive evaluation interface into the database 32 and returning results. The operation module 33 can be a keyboard, mouse, etc. and the display module 34 is a screen or video wall. As to the third wireless communication device 35, it is connected with the first wireless communication device 184 of the control module 18 of the feeding management unit 1 and the second wireless communication device 24 of the mobile monitoring unit 2 for communication. The first wireless communication device 184, the second wireless communication device 24, and the third wireless communication device 35 are communication devices which connect one another by internet such as Wi-Fi, 4G, or 5G etc. or base stations.

While in use, additives such as medicines or nutrient agents are added into the additive barrel 14. Before adding the additives, first a barcode on a bottle or container for mounting the additives are arranged at a position corresponding to the barcode scanner 143 over the additive barrel 14 to read and record the name of the additive mounted in the bottle or container and then the additive is poured into the additive barrel 14. At the moment, the third level sensor 141 mounted in the additive barrel 14 converts liquid level of the additive measured into volume (the number of cubic centimeter (cc)) to be displayed on the display 142 of the additive barrel 14. When staff members observe that the amount of the additive added reaches a target value, stop pouring the additive.

Moreover, the user can communicate with the control module 18 of the feeding management unit 1 and the remote monitoring unit 3 by the monitoring APP 25 installed in the mobile monitoring unit 2 for executing functions including setting, control, monitoring, queries, etc. An operation interface shown on the operation and display module 22 of the mobile monitoring unit 2 is used for settings of control parameters and schedules related to water consumption of the poultry and livestock through the monitoring APP 25. Then the parameters and the schedules are wirelessly transmitted to the control module 18 of the feeding management unit 1 to complete the settings. Or the user can directly control action of components of the feeding management unit 1 including the inlet valve 131, the outlet valve 139, the discharge valve 164, etc. by an operation interface of the monitoring APP 25 and receive various sensing data, water consumption data, images, and operation status of the feeding management unit 1 in a real-time manner while information such as the water consumption data is shown in figures. Or the user can set date or duration of queries by buttons on the operation interface of the monitoring APP 25 and then search various data or warning information through the remote monitoring unit 3. Once the user intends to reset the parameters and the schedules set previously, a reset-button on the operation interface of the monitoring APP 25 is pressed to return to initial state. After the control parameters and the schedules being set again by the user, the MCU 181 of the control module 18 of the feeding management unit 1 automatically drives the feeding management unit 1 to work according to the control parameters and the schedules being set.

When the MCU 181 of the control module 18 of the feeding management unit 1 is activated to work, first the supply valve 111 is opened so that water of the water supply source 11 is introduced into the water quality test tank 12 through the pipeline. After the water reaching the level set, the first level sensor 122 in the water quality test tank 12 sends signals to the MCU 181 of the control module 18 for allowing the MCU 181 to close the supply valve 111 and drive the water quality sensor 121 in the water quality test tank 12 to perform water quality test including turbidity, pH value (potential of hydrogen, acidity), conductivity, etc. and send test results to the MCU 181 of the control module 18. Once the test results meet test standards, the MCU 181 of the control module 18 opens the inlet valve 131 for introducing water in the water supply source 11 into the water supply tank 13 through the pipeline until the water reaches the level set. Then the second level sensor 132 in the water supply tank 13 sends signals to the MCU 181 of the control module 18 for closing the inlet valve 131. Later the MCU 181 of the control module 18 opens the additive valve 144 so that the additive in the additive barrel 14 is delivered into the water supply tank 13 until certain amount of the additive is added and then the additive valve 144 is closed. At the same time, the drain valve 123 on the bottom side of the water quality test tank 12 is opened by the MCU 181 for discharging the remaining tested water in the water quality test tank 12. When the first level sensor 122 in the water quality test tank 12 detects that the water in the water quality test tank 12 is drained, it sends signals to the MCU 181 for closing the drain valve 123.

When the poultry or livestock need to drink water, they are moved to the drinking faucet 133 of the water supply tank 13 under guidance of the electric fence 151. When the poultry or livestock are in contact with the touch switch 135 on the drinking faucet 133, water flows and the poultry or livestock drink the water. While drinking, the tag reader 152 disposed over the drinking faucet 133 reads sensing tags on the poultry or livestock for identification of the poultry or livestock which have drunk the water. Moreover, when the water level sensor 138 in the drinking bowl 137 detects that there is no water in the drinking bowl 137, the MCU 181 of the control module 18 opens the electric fill valve 136 on the outlet pipe 134 for filling water into the drinking bowl 137. This is another way allows the poultry or livestock to drink water. The drinking bowl 137 can also receive water flowing through and leaking from the poultry or livestock' mouth and residual amount of water left after water consumed by the poultry or livestock can be measured by the water level sensor 138 in the drinking bowl 137. Furthermore, the poultry or livestock step on the weighing scale 15 located under the drinking faucet 133 and the drinking bowl 137 while drinking water, the weighing of the poultry or livestock and the drinking of water are completed at the same time. When the drinking faucet 133 or the electric fill valve 136 is out of order and leaking, the outlet valve 139 can be closed to turn off water flow for repairs and maintenance, without wasting water. Besides the drinking bowl 137, the water leaking from the poultry or livestock' mouth can also be received by the recycle container 161 located under the drinking bowl 137 and then flowing into the recovery tank 16 for storage. When the fourth level sensor 163 in the recovery tank 16 detects the water reaches the full water level, the fourth level sensor 163 sends signals to the MCU 181 of the control module 18 to open the discharge valve 164 for draining the water from the recovery tank 16. Then the washing valve 165 is opened and clear water being pressurized by the pressurizer 166 is introduced into the recovery tank 16 for washing and cleaning. After completing the washing and cleaning, the washing valve 165 is closed while the discharge valve 164 is not closed until the water in the recovery tank 16 is drained off.

When the MCU 181 of the control module 18 drives the inlet valve 131 to open and close for understanding of water intake, how many times the inlet valve 131 is opened and closed is counted to learn how many times the water supply tank 13 is full of water. The number of times the recovery tank 16 being full of water is obtained by the number of times the discharge valve 164 is opened and closed. Then the second level sensor 132 in the water supply tank 13 and the fourth level sensor 163 in the recovery tank 16 are respectively used to get residual amount of water in the water supply tank 13 and the recovery tank 16. By the function in the water consumption computing program of poultry and livestock built in the MCU 181, W=p*N+ (p–L); R=q*M+ K; D=W–R, the full water volume of the water supply tank 13 multiplied by the number of times the water supply tank 13 being full of water and then plus the residual amount of water in the water supply tank 13 is the estimated amount of water supply. The full water volume of the recovery tank 16 multiplied by the number of times the recovery tank 16 being full of water and then plus the residual amount of water in the recovery tank 16 equals the estimated amount of water recovered. Next the estimated amount of water supply minus the estimated amount of water recovered is the estimated amount of water consumed by the poultry or livestock which is then displayed on the human-machine interface 182. Once the amount of water consumed in a fixed duration is lower than normal amount preset, the MCU 181 of the control module 18 drives the warning indicator 183 to emit light for warning of insufficient water consumption of the poultry and livestock. The water consumption data and warning messages are also shown on the mobile monitoring unit 2 at the same time. Weight of the poultry and livestock measured at the weighing scale 15 and growth images of the poultry and livestock captured by the camera module 153 are also transmitted to the mobile monitoring unit 2.

Thereby users can monitor drinking and growth status at the remote end. Other information including the amount of water consumed, the weight, and the growth images of the poultry or livestock is also transmitted to the remote monitoring unit 3 for storage. The queries are input through clicking of the interactive evaluation interface operated by the operation module 33 of the remote monitoring unit 3 and then SQL processes the queries and retrieves multiple pieces of information from the database 32 based on the queries. Thereby evaluation of drinking state of the poultry or livestock is completed quickly. The users can also set the date or duration of queries by buttons on the operation interface on the operation and display module 22 of the mobile monitoring unit 2 and then find out information such as various data or warning used for judgement and decision making.

It should be noted that the feeding management unit 1 is provided with the hydro generator 17 in the pipeline thereof so that power is generated when water is flowing continuously in the pipeline and then the power generated is stored in the rechargeable battery 171. Thereby the power is provided to components which require power such as the feeding management unit 1 for energy-saving and cost effectiveness.

The above embodiments or figures are not intended to limit implementation of the present invention. In a preferred embodiment, valves such as the discharge valve 164 can be driven to work by the MCU 181 of the control module 18 of the feeding management unit 1. The valves such as the discharge valve 164 can also be turned on or off by manual operation for removal of residual water in the pipelines and drainage of stale water without having impact on the poultry and livestock health. The plurality of control parameters and schedules are either set through the mobile monitoring unit 2 at the remote end or directly set by the human-machine interface 182 of the control module 18. In another embodiment, a plurality of feeding management units 1 is provided and distributed on a plurality of feeding areas correspondingly. Data obtained by the control modules 18 of the feeding management units 1 on the respective feeding areas can be displayed on the display module 34, a video wall, of the remote monitoring unit 3 at the same time.

In summary, the system according to the present invention has the following advantages.

1. By the present poultry and livestock feeding and monitoring system, health conditions of the poultry and livestock such as water-drinking and the body weight can be understood fully and this helps to find out health problems of the poultry and livestock earlier and take corresponding management measures in a real-time manner for improving rearing performance of the poultry and livestock.

2. By present poultry and livestock feeding and monitoring system, the drinking water quality of the poultry and livestock can be understood accurately and nutrient agents are added in proper time to increase survival rate of the poultry and livestock reared.

3. The hydro generator is mounted in the respective pipelines of the present poultry and livestock feeding and monitoring system so that power is generated and stored when water flows in the pipelines continuously. Thereby the power the system needs is provided and both energy-saving and cost effectiveness are achieved.

4. The present poultry and livestock feeding and monitoring system is connected with the mobile monitoring unit such as mobile phone. Thereby users not only can monitor water-drinking and growth conditions of the poultry and livestock at the remote end in a real-time manner, but also can set up various control parameters and schedules. The poultry and livestock rearing and monitoring are much more convenient than before.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A poultry and livestock feeding and monitoring system comprising:

at least one feeding management unit which includes a water supply source, a water supply tank connected with the water supply source by a pipeline, a recovery tank, and a control module; an inlet valve is disposed on the pipeline between the water supply source and the water supply tank while the water supply tank is provided with a second level sensor mounted therein and connected with an outlet module by a pipeline; a recycle container is arranged under the outlet module of the water supply tank and connected with the recovery tank by a pipeline; the recovery tank is provided with a fourth level sensor mounted therein and a discharge valve is disposed on the recovery tank; the control module is composed of a microcontroller (MCU), a human-machine interface, and a first wireless communication device while the MCU is connected with the human-machine interface, the first wireless communication device, the inlet valve, the second level sensor and the outlet module of the water supply tank, and the fourth level sensor and the discharge valve of the recovery tank for signal transmission;

at least one mobile monitoring unit which includes a micro processing unit (MPU), an operation and display module, a data storage module, and a second wireless communication device; the MPU is connected with the operation and display module, the data storage module, and the second wireless communication device for transmitting signals; a monitoring application (APP) is installed in the data storage module while the second wireless communication device of the mobile monitoring unit and the first wireless communication device of the feeding management unit are connected for communication; and a remote monitoring unit which includes a central processing unit (CPU), a database, an operation module, a display module, and a third wireless communication device while the CPU is connected with the database, the operation module, the display module, and the third wireless communication device for signal transmission; the third wireless communication device is connected with the first wireless communication device of the feeding management unit and the second wireless communication device of the mobile monitoring unit for communication;

wherein a water consumption computing program of poultry and livestock is built in the MCU of the control module of the feeding management unit for monitoring during a fixed duration and an equation of function built in the water consumption computing program is:

$$W = p*N + (p - L); R = q*M + K; D = W - R$$

wherein W is amount of water supplied; R is amount of water recovered; D is amount of water consumed; p is full water volume of the water supply tank; N represents how many times the water supply tank is full of water; L is residual amount of water in the water supply tank; q is full water volume of the recovery tank; M represents how many times the recovery tank is full of water; K is residual amount of water in the recovery tank.

2. The poultry and livestock feeding and monitoring system as claimed in claim 1, wherein the feeding management unit further includes a water quality test tank which is connected with the water supply source by a pipeline; a supply valve is disposed on the pipeline which connects the water supply source with the water quality test tank; a water quality sensor is mounted in the water quality test tank while the supply valve and the water quality sensor are connected with the MCU of the control module for signal transmission.

3. The poultry and livestock feeding and monitoring system as claimed in claim 1, wherein the feeding management unit further includes an additive barrel connected with the water supply tank by a pipeline and an additive valve is arranged at the pipeline which connects the additive barrel with the water supply tank; the additive valve is connected with the MCU of the control module for signal transmission; a third level sensor is mounted in the additive barrel and a display is disposed on the additive barrel while the display and the third level sensor are connected for signal transmission.

4. The poultry and livestock feeding and monitoring system as claimed in claim 1, wherein the feeding management unit further includes an additive barrel connected with the water supply tank by a pipeline and an additive valve is arranged at the pipeline which connects the additive barrel with the water supply tank; a barcode scanner is disposed on the additive barrel; the additive valve and the barcode scanner are connected with the MCU of the control module for signal transmission.

5. The poultry and livestock feeding and monitoring system as claimed in claim 1, wherein the feeding management unit further includes a weighing scale disposed under the outlet module of the water supply tank and a tag reader arranged over the outlet module while the weight scale and the tag reader are connected with the MCU of the control module for signal transmission.

6. The poultry and livestock feeding and monitoring system as claimed in claim 1, wherein at least one hydro generator is arranged at least one pipeline of the feeding management unit and electrically connected with at least one rechargeable battery.

7. The poultry and livestock feeding and monitoring system as claimed in claim 1, wherein the recovery tank and the water supply source of the feeding management unit are connected by a pipeline on which a washing valve and a pressurizer are disposed in turn; the washing valve and the pressurizer are connected with the MCU of the control module for signal transmission.

8. The poultry and livestock feeding and monitoring system as claimed in claim 1, wherein the outlet module of the water supply tank is selected from the group consisting of a drinking faucet, an outlet pipe, and a combination thereof; a touch switch and an electric fill valve are respectively arranged at the drinking faucet and the outlet pipe; a drinking bowl is connected with an end of the outlet pipe and provided with a water level sensor therein; the touch switch, the electric fill valve, and the water level sensor of the drinking bowl are connected with the MCU of the control module for signal transmission.

9. The poultry and livestock feeding and monitoring system as claimed in claim 1, wherein the control module of the feeding management unit further includes a warning indicator which is connected with the MCU for signal transmission.

* * * * *